US012362550B2

(12) United States Patent
Bartminn et al.

(10) Patent No.: US 12,362,550 B2
(45) Date of Patent: Jul. 15, 2025

(54) OFFSHORE WIND ENERGY SYSTEM

(71) Applicants: Daniel Bartminn, Elmshorn (DE); Artur Czarnecki, Hamburg (DE)

(72) Inventors: Daniel Bartminn, Elmshorn (DE); Artur Czarnecki, Hamburg (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 18/296,746

(22) Filed: Apr. 6, 2023

(65) Prior Publication Data
US 2023/0261455 A1 Aug. 17, 2023

Related U.S. Application Data

(63) Continuation of application No. PCT/EP2021/076557, filed on Sep. 28, 2021.

(30) Foreign Application Priority Data

Oct. 28, 2020 (DE) ..................... 10 2020 128 293.1

(51) Int. Cl.
*F03D 13/25* (2016.01)
*E02B 17/00* (2006.01)
*E02D 5/52* (2006.01)
*H02G 3/22* (2006.01)
*H02G 9/02* (2006.01)
*H02G 15/00* (2006.01)
*E02B 17/02* (2006.01)
(Continued)

(52) U.S. Cl.
CPC ............... *H02G 3/22* (2013.01); *E02B 17/00* (2013.01); *E02D 5/526* (2013.01); *F03D 13/25* (2016.05); *H02G 9/02* (2013.01); *H02G 15/003* (2013.01); *E02B 2017/0065* (2013.01); *E02B 2017/0091* (2013.01); *E02B 2017/0095* (2013.01); *E02B 17/025* (2013.01); *E02B 17/027* (2013.01); *E02D 27/425* (2013.01); *E02D 27/525* (2013.01); *E02D 2300/002* (2013.01); *E02D 2300/0029* (2013.01); *E02D 2600/20* (2013.01)

(58) Field of Classification Search
CPC ................... F03D 13/25; E02D 27/425; E02B 2017/0091; E02B 2017/0065; E02B 17/00; H02G 3/22; H02G 9/02
See application file for complete search history.

(56) References Cited

U.S. PATENT DOCUMENTS

| 2014/0116559 | A1* | 5/2014 | Zhang | ........................ F16L 3/26 138/106 |
| 2019/0214801 | A1* | 7/2019 | Smith | ....................... H02G 1/10 |

FOREIGN PATENT DOCUMENTS

| CN | 104934920 A | 9/2015 |
| CN | 108808568 A | 11/2018 |

(Continued)

*Primary Examiner* — Sean D Andrish
(74) *Attorney, Agent, or Firm* — Reinhart Boerner Van Deuren P.C.

(57) ABSTRACT

An offshore wind energy system comprising a foundation having a first hollow structural element with a longitudinally extending, circumferential first wall. A cable bushing penetrates through the first wall and is arranged in the first wall. At least one cable guide arrangement extends in a radial direction and is arranged at an outer shell surface of the first wall of the first hollow structural element. The cable guide arrangement is configured to guide a submarine cable exiting the cable bushing from the cable bushing to a submarine bottom surface.

18 Claims, 6 Drawing Sheets

(51) Int. Cl.
*E02D 27/42* (2006.01)
*E02D 27/52* (2006.01)

(56) References Cited

FOREIGN PATENT DOCUMENTS

| | | | |
|---|---|---|---|
| CN | 111264513 A | | 6/2020 |
| DE | 20 2006 016 240 U1 | | 4/2007 |
| DE | 10 2018 125 323 A1 | | 4/2020 |
| DE | 102019110506 A | | 10/2020 |
| EP | 1985845 | * | 10/2008 |
| EP | 3696326 A1 | | 8/2020 |
| GB | 2473058 | * | 3/2011 |
| GB | 2473058 A | | 3/2011 |
| JP | 2016205162 A | | 12/2016 |
| JP | 2016205163 A | | 12/2016 |
| JP | 2016226194 A | | 12/2016 |
| KR | 102067256 B1 | | 1/2020 |
| WO | WO 2005/005752 A1 | | 1/2005 |
| WO | WO 2016/189037 A1 | | 12/2016 |
| WO | WO 2020/074421 A1 | | 4/2020 |
| WO | WO 2020/157196 A1 | | 8/2020 |

\* cited by examiner

OFFSHORE WIND ENERGY SYSTEM

CROSS-REFERENCE TO RELATED PATENT APPLICATIONS

This patent application is a continuation of International Application No. PCT/EP2021/076557, filed on Sep. 28, 2021, which claims the benefit of priority to German Patent Application No. 10 2020 128 293.1, filed Oct. 28, 2020, the entire teachings and disclosures of both applications are incorporated herein by reference thereto.

FIELD

The application relates to an offshore wind energy system comprising a foundation having a first hollow structural element with a longitudinally extending and circumferential first wall. In addition, the application relates to an offshore structure, a cable guide arrangement, and a use of a cable guide arrangement.

BACKGROUND

Offshore structures are increasingly being built, in particular at sea. For example, offshore wind farms with a plurality of offshore wind energy structures are being installed in order to generate electrical energy and to provide electrical energy, respectively, from so-called renewable energy sources. Offshore locations are usually characterized by relatively continuous wind conditions and high average wind speeds, so that so-called offshore wind farms are increasingly being installed.

Usually, an offshore wind farm comprises a plurality of offshore wind energy structures, such as a plurality of offshore wind turbines, met masts and/or at least one offshore substation. By means of the offshore substation, the offshore wind farm may be electrically connected, for example, to an onshore substation or a further offshore substation and offshore converter station, respectively. An onshore substation, in turn, may be connected to a public power grid.

An offshore wind turbine is configured to convert kinetic wind energy into electrical energy. Power cables in the form of submarine cables are laid to transmit the generated electrical energy between two offshore wind energy structures or an offshore wind energy structure and an onshore structure. In particular, a submarine cable may be electrically connected to a generator of an offshore wind turbine.

For offshore wind farms, but also for other offshore structures (e.g. platforms for the exploration of gas and/or oil), it is common practice to anchor (also called founding) an offshore structure directly to respectively in the underwater bottom, in particular a seabed, by means of a foundation (e.g. monopile, tripod, tripile or jacket foundations).

A foundation comprises at least one tower-shaped, in particular cylindrical, hollow structural element (also called tower-shaped foundation structure). A hollow structural element usually comprises a circumferential wall extending in the longitudinal direction, wherein the (foundation) wall can be bounded on the underside by a lower end face and on the upper side by an upper end face.

As has already been described, an offshore wind turbine, for example, requires the generated electrical power (or electrical energy) to be transmitted by a submarine cable to a further (offshore) structure, e.g., of the wind farm.

In the prior art, it is known for offshore structures to guide a submarine cable connected to an offshore device of the offshore structure through so-called J-tubes to the underwater bottom surface (in particular a seabed surface). However, a problem with J-tubes is that they can cause additional wave loads. In addition, they can be damaged by a ship impact and must also be cleared of fouling on a regular basis.

In order to solve this problem, it is known from the prior art to first guide a submarine cable downward from the offshore device through the interior space and hollow space, respectively, of the at least one hollow structural element (in particular freely suspended). In the vicinity of the underwater bottom surface (distance<1 m), a cable bushing and cable recess, respectively, is provided in the wall of the hollow structural element, through which the submarine cable is guided from the interior space outward to the underwater bottom surface.

In particular for foundations comprising a first hollow structural element and a second hollow structural element that are plugged into each other, but also for other foundations, guiding out the submarine cable is a major challenge. For example, if two hollow structural elements are plugged together near the underwater bottom surface and an annular space is grouted between the inner shell surface of the second hollow structural element and the outer shell surface of the first hollow structural element and/or a so-called slip-joint is established between the hollow structural elements, the guiding of a submarine cable out of the interior space is complex and costly.

This means that for two concentrically superimposed hollow structural elements a simultaneous penetration is necessary. A particular problem here is that these hollow structural elements are only installed at the installation site of the offshore structure, and it regularly happens during installation that the hollow structural elements are installed slightly twisted against each other. As a result, the cable bushes in the respective hollow structural elements cannot overlap and it is therefore not possible to guide a submarine cable out. In order to prevent this, in particular an extremely precise installation of the hollow structural elements is required. However, this increases the installation effort.

In addition, the annular space between the hollow structural elements is regularly grouted. In order to prevent the grout material from penetrating into the interior through the cable bushings arranged in the area of the annular space, special sealing of the cable bushings against the grout material is required. This sealing must not be damaged during installation of the hollow structural elements. This additionally increases the effort of the installation.

In principle, one solution to the problem described above would be to lead the submarine cable out of the interior above the overlap area and the annular space area, respectively. However, this is not considered feasible in the prior art so far. In particular, with the then large distances to the underwater bottom surface of more than 5 m, the submarine cable is exposed to the strong current forces along this route without protection. This would result in excessive stress on the submarine cable, which cannot be absorbed by the cable protection systems available on the market.

BRIEF SUMMARY

Therefore, the object of the application is to provide an offshore wind energy system in which the disadvantages described above are at least reduced and, in particular, a guidance of the submarine cable from a foundation to an underwater bottom surface is possible in a simpler and effort-reducing manner.

The object is solved according to a first aspect of the application by an offshore wind energy system. The offshore wind energy system comprises a foundation having a first hollow structural element with a longitudinally extending and circumferential first wall. A cable bushing penetrating the first wall is arranged in the first wall. The offshore wind energy system comprises at least one cable guide arrangement extending in radial direction and arranged at an outer shell surface of the first wall of the first hollow structural element, wherein the cable guide arrangement is configured to guide a submarine cable exiting the cable bushing from the cable bushing to an underwater bottom surface.

By providing, in contrast to the prior art, according to the application an offshore wind energy system with a cable guide arrangement that guides a submarine cable exiting through a cable bushing to the underwater bottom surface, the disadvantages of the prior art are at least reduced. In particular, guiding the submarine cable from a foundation to an underwater bottom surface is possible in a simpler and less costly manner.

In particular, the cable guide arrangement reduces the stress on the submarine cable due to current forces that may act on the submarine cable. This makes it possible to guide the submarine cable out of the foundation even at a height of more than 5 m above the underwater bottom surface (in an initial installation state of the foundation).

An offshore wind energy system according to the application comprises at least one foundation and at least one cable guide arrangement.

A foundation is in particular part of an offshore structure and preferably serves to support at least one offshore device of the offshore structure. An offshore structure is preferably an offshore wind energy structure, such as an offshore wind turbine, an offshore met mast or an offshore substation. In particular, an offshore structure according to the application is an offshore structure to which at least one submarine cable is connected. In particular, the submarine cable may be connected to the offshore device of the offshore structure. For example, an offshore structure may also be a drilling or production platform or another offshore platform, preferably configured to produce, convert and/or store energy, such as an offshore facility for the production of hydrogen (provided that a submarine cable is connected to the offshore structure).

As has already been described, an offshore structure may comprise an offshore device that may be fixed by the foundation in an underwater bottom, in particular a seabed. In particular, an offshore structure may be formed by the offshore device (e.g., a platform, a nacelle, tower, generator, rotor, substation, and/or the like) and the at least one foundation.

The foundation according to the application comprises a first hollow structural element respectively a first tower-shaped foundation structure. A hollow structural element according to the application is preferably cylindrical. A cylindrical hollow structural element may in particular be a hollow pile.

The first hollow structural element comprises a circumferential first wall extending longitudinally (i.e., along the longitudinal axis of the hollow structural element). In particular, a hollow structural element according to the application may comprise a circular cross-sectional area. In other variants of the application, another cross-sectional area may also be provided, such as an oval-shaped cross-sectional surface.

A wall of a hollow structural element may comprise two distal ends, each bounded by opposing end faces. A first end face may be an upper end face and a second end face may be a lower end face. Upper and lower end faces may be defined by the position of the hollow structural element in the final installation state. Thereby, in the installation state, the lower end face is arranged in the direction of the underwater bottom. In particular, the upper end face may protrude at least from the underwater bottom in the direction of the water surface.

A cable bushing respectively recess which penetrates the first wall is arranged in the first wall for a passage of a submarine cable. A cable bushing is formed in particular in such a way that a submarine cable can be guided out of the interior of the first hollow structural element to the outside. In particular, the submarine cable can be arranged (freely) suspended in a cavity and interior, respectively, formed by the first wall and can be guided out of the cavity to the outside through the cable bushing.

In an offshore wind turbine, for example, not only the foundation but also the offshore device may be mounted in an installed state, wherein the offshore device comprises a tower with a nacelle comprising turbine and wind wheel. From the generator, which is located in the nacelle, the submarine cable can run through the tower and the first hollow structural element to the cable bushing, where it is guided out of the foundation.

According to the application, it has been recognized that the forces acting on an outwardly guided submarine cable can be reduced if a cable guide arrangement is arranged at the outer shell surface respectively an outer side of the first wall of the first hollow structural element. An arrangement at the outer shell surface means in particular that the cable guide arrangement is arranged outside the foundation. Preferably, an arrangement at the outer shell surface comprises a radial spacing of the cable guide arrangement to respectively from the outer shell surface of the foundation.

The cable guide arrangement extends, starting from the first hollow structural element, in a radial direction. Preferably, the cable guide arrangement may be aligned with the cable bushing. The cable guide arrangement may be a separate arrangement and may in particular be arranged on the underwater bottom surface, for example attached to the underwater bottom.

By definition, the cable guide arrangement need not (but can) be in direct contact with the outer shell surface of the hollow structural element. The cable guide arrangement and its at least one element can be arranged at a (radial) distance of up to 5 m, preferably between 0.25 m and 3 m, from the outer shell surface. Accordingly, the arrangement at the outer shell surface may be represented by an indirect connection via the electrical submarine cable.

The cable guide arrangement is configured in such a way that the outgoing submarine cable is guided in the radial direction from the cable bushing to an underwater bottom surface of the underwater bottom. In the present case, guiding the submarine cable means in particular that the freedom of movement of the submarine cable in the horizontal and/or vertical direction is at least restricted by the cable guide arrangement. In this way, the forces exerted on the submarine cable by a current and thus the load on the submarine cable can be reduced.

It shall be understood that two or more cable bushings may be provided, for example for a corresponding number of submarine cables. It shall be further understood that a corresponding number of cable guide arrangements may be provided.

According to a preferred embodiment of the offshore wind energy system according to the application, the cable bushing of the first hollow structural element in an installation state of the foundation may be arranged at least more than 5 m above the underwater bottom surface, in particular more than 6 m, more preferably between 8 m and 12 m. In other words, the distance between the underwater bottom surface and in particular the lower edge of the cable bushing may be greater than 5 m, preferably greater than 6 m, and more preferably between 8 m and 12 m.

The underwater bottom surface is defined in particular as the vertical plane, which is indicated in the planning documents of the offshore structure (in particular of an offshore wind farm) as the water depth below the reference plane LAT (lowest astronomical tide). It shall be understood that the water depth and thus the distance to the cable bushing may change after installation of the offshore structure, for example due to removal or accumulation of sediments and/or backfilling of a scour protection.

In particular, the arrangement of the cable guide arrangement allows the submarine cable to be safely guided out of the first hollow structural element even at the aforementioned heights. This makes it possible to carry out sealing measures and/or grouting in the range between 0 m and 5 m, preferably 8 m, without the submarine cable having to be guided out in a complex and costly manner.

According to a preferred embodiment of the offshore wind energy system according to the application, the foundation may comprise a second hollow structural element. The second hollow structural element may include an overlap portion projecting (externally or internally) beyond an end portion (also referred to as an overlap portion) of the first hollow structural element, and an embedded portion at least partially embeddable into an underwater bottom. The cable bushing of the first hollow structural element may be arranged (in an installation state of the foundation) at least above the overlap portion (i.e., above the upper end of the second hollow structural element).

In particular, the first hollow structural element and the second hollow structural element may be inserted into each other in the overlap section. Preferably, two concentric tubes inserted into each other may be formed as a foundation. For example, the first hollow structural element may comprise an outer diameter that is congruent with an inner diameter of the second hollow structural element. Alternatively, the first hollow structural element may have an inner diameter congruent with an outer diameter of the second hollow structural element.

The first hollow structural element can also be referred to as a transition piece and the second hollow structural element as an embedded element. In particular, in a foundation state of the foundation, the embedded element is embedded respectively founded in the underwater bottom with a specific embedment depth respectively embedment length (e.g., between 7 and 20 m).

The second hollow structural element comprises, in particular, a longitudinally extending, circumferential second wall. Preferably, no cable bushing is arranged in the second wall.

In particular, the first hollow structural element comprises a transition portion that protrudes from the second hollow structural element at the end face. In particular, a (first and/or second) hollow structural element can preferably be formed monolithically and tubularly and may extend in a longitudinal direction. This longitudinal direction of the first hollow structural element is preferably collinear with the longitudinal direction of the second hollow structural element in the installation state.

The transition piece may comprise at least one ship landing device with ladder.

The advantage of a foundation formed by two hollow structural elements and mountable at the installation site is, in particular, that the weight of a hollow structural element to be transported, in particular a pile, can be significantly reduced.

The first hollow structural element may be connected to the second hollow structural element by means of a grout joint or by a slip-joint method.

An (circumferential) annular space may be provided between the first hollow structural element and the second hollow structural element in an inserted respectively overlapped state in the region of the overlap portion of the second hollow structural element. According to one embodiment of the offshore wind energy system according to the application, in an annular space between the inner shell surface of the second hollow structural element and the outer shell surface of the first hollow structural element, a seal abutting the shell surfaces may be circumferentially arranged. Alternatively, in an annular space between the outer shell surface of the second hollow structural element and the inner shell surface of the first hollow structural element, a seal abutting the shell surfaces may be circumferentially arranged. In particular in the longitudinal direction of the first hollow structural element, the seal can be arranged below the cable bushing.

Alternatively or additionally, according to a preferred embodiment of the offshore wind energy system according to the application, an annular space between the inner shell surface of the second hollow structural element and the outer shell surface of the first hollow structural element may be at least partially grouted. Alternatively, an annular space between the outer shell surface of the second hollow structural element and the inner shell surface of the first hollow structural element may be at least partially grouted. An upper edge of the grout connection may be arranged at least below a lower edge of the cable bushing in the longitudinal direction of the foundation. The grout connection may be established such that it is completely below the cable bushings in the overlap region. In this case, the seal can preferably be omitted.

If a seal is provided, the seal can preferably be expandable in such a way that the volume of the seal can be increased after mounting of the hollow structural elements, in particular that the seal is pressurized pneumatically or hydraulically with a filling material. The annular space can be relatively narrow, in particular if a slip-joint connection rather than a grout connection is made. Only a small tolerance may be allowed when inserting the first hollow structural element into or over the second hollow structural element. In order to prevent the seal from interfering with the insertion of the transition piece into the hollow structural element or being damaged during insertion, the seal may be expandable. In particular, the seal is shaped such that its volume is expandable after mounting of the hollow structural elements. For example, the seal may be inflated, either pneumatically or hydraulically, by being impacted with a filler material. A volume can be kept inside the seal as a cavity. After assembly, this volume can be filled with the filling material under pressure so that the seal closes the annular gap between the hollow structural element and the transition piece in the area of the cable bushings. Alternatively, the seal can have swellable (e.g., clay-containing) material which swells on contact with water.

Furthermore, insertion aids arranged at an upper front edge of the second hollow structural element can cooperate with insertion aids arranged at a lower front edge of the first hollow structural element in such a way that a relative alignment of the azimuth angles of the hollow structural elements to each other is defined. The insertion aids can be interlocking projections and recesses projecting radially inward and radially outward. This can simplify the assembly of the first and second hollow structural elements.

According to a further embodiment, at least one radially inwardly facing stop can be formed on the inner shell surface of the wall in an embedded portion of the second hollow structural element. Particularly alternatively thereto, at least one radially outwardly facing stop can be formed on the outer shell surface of the wall in an embedded portion of the second hollow structural element. In an inserted state, the lower end face of the first hollow structural element can rest on the at least one stop.

A wall of a hollow structural element can be formed of metal, in particular steel. According to a preferred embodiment, a (first and/or second) wall of a (first and/or second) hollow structural element may be formed of a mineral building material.

According to one embodiment of the offshore wind energy system according to the application, the mineral building material may contain cement at least in parts. The mineral building material is preferably concrete, which is mixed from cement, gravel, sand and water and is hardened, in particular, after casting.

For good load-bearing capacity, it has been found that the water-cement ratio (w/c) of the mineral building material can be less than 0.45, in particular less than 0.35, and more preferably less than 0.3.

The moments and shear forces occurring in wind turbines in particular can be adequately absorbed by the hollow structural element if the building material has a strength class of at least C40/50, preferably C70/85, in particular C100/115 according to EN 206 and EN1992.

Sufficient long-term stability of the foundation over the service life of an offshore structure, in particular an offshore wind turbine, in particular in the case of permanent penetration by water, can be achieved in particular by ensuring that the mineral building material has a pore content (air voids) of less than 5%, preferably less than 3%, in particular less than 2%. The total porosity measured with mercury pressure porosity should be $P_{28d}$<12 vol-% after 28 days and $P_{90d}$<10 vol-% after 90 days.

In particular, in the case of permanent penetration of water during a foundation installation, adequate service life can be achieved by ensuring that the mineral building material has a porosity of $P_{28d}$<12 vol % when measured by mercury pressure porosimetry, as described earlier. $P_{28d}$ is a measurement over 28 days. Preferably, the porosity is also less than 10 vol-%. For $P_{90d}$, that is a measurement over 90 days, the porosity is preferably <10 vol-%, in particular <8 vol-%.

Sufficient load-bearing capacity of the foundation can be achieved in particular by the mineral building material having a cement content of at least 350 kg/m³, preferably at least 450 kg/m³, more preferably at least 650 kg/m³.

Furthermore, a wall can be mechanically prestressed. The prestressing allows cracks to be pressed over and thus the surfaces to be kept largely free of tensile stress, which is in particular advantageous in the case of fluctuating torque loads. The prestressing force is preferably 5%, in particular more than 15%, greater than the compressive strength of the foundation wall. The prestressing force is preferably applied in the longitudinal direction.

According to a further embodiment, the mineral building material can be (metallically) reinforced for even greater stability, in particular under dynamic ambient conditions. The metallic reinforcement is in particular a steel reinforcement. The reinforcement can be given by fibers or reinforcing bars. Fiber reinforcement can also be achieved by carbon fiber, glass fiber or metal fiber.

The reinforcement may be formed so that it has concrete cover at 90% of the measuring points, preferably at 98% of the measuring points, at least as 26 mm, preferably at least as 40 mm.

The mineral building material may be reinforced with ferritic stainless reinforcing steel. The chromium content of the reinforcement may not exceed 18% by weight. The reinforcement may contain molybdenum.

The mineral building material may be reinforced with austenitic stainless reinforcing steel. The reinforcement may have at least 5 M %, in particular between 5 M % to 14 M % nickel and/or between 12 M % to 22 M %, in particular 15 M % to 20 M % chromium.

The mineral building material may be reinforced with ferritic-austenitic stainless reinforcing steel. The reinforcement may have at least 18 M %, in particular between 15 M %-20 M % chromium and 2 M %-8 M % nickel and optionally molybdenum.

For increased stability, it is suggested that the mineral building material can be sealed, in particular with a sealing film. Such a sealing foil can be, for example, an aluminum-butyl sealing foil.

According to a further embodiment of the offshore wind energy system according to the application, the cable guide arrangement may comprise at least one (cable) support element configured to at least vertically supporting the submarine cable. By providing at least one support element with a vertical support function, which supports the submarine cable at least in a vertical direction, a significant load reduction for the submarine cable can already be achieved. Vertical support means in particular that the freedom of movement of the submarine cable is restricted downwards and/or upwards.

Furthermore, according to a preferred embodiment of the offshore wind energy system according to the application, a height (with respect to the underwater bottom surface) of the at least one support element may reduce in a step-like or continuous manner in a radial direction (starting from the outer shell surface). Preferably, at least one wedge-shaped respectively ramp-shaped support element may be provided, which extends in a radial direction. The height of the wedge-shaped respectively ramp-shaped support element can preferably reduce continuously. For example, a lower surface (in particular a foot portion) of the wedge-shaped respectively ramp-shaped support element may be substantially horizontal respectively level, and the upper surface (in particular a head portion) may be an inclined surface. In an installation state, the lower surface may contact the underwater bottom surface or even be embedded in the underwater bottom. The upper surface may support the submarine cable and support it at least in a vertical direction.

Furthermore, a plurality of individual support elements (for example in the form of a plurality of drop lances) can be provided, wherein the plurality of support elements of a cable guide arrangement extends in a radial direction. In the case of a plurality of individual support elements, the height of the support elements arranged in a radial direction may gradually or stepwise reduce, i.e., from support element to support element.

In the present case, the height means in particular the distance between the part contacting the submarine cable (for example the upper surface) of the at least one support element and the underwater bottom surface (assuming an almost flat underwater bottom surface over the entire radial extension direction of the cable guide arrangement).

In principle, the at least one support element may be formed of any material and may have any shape, as long as it is ensured that the at least one support element guides the submarine cable from the cable bushing to the underwater bottom surface in an at least vertically supported manner. For example, the at least one support element may be formed by bulk material. The bulk material may be piled up in a ramp-like manner on an outer wall. The submarine cable may then be laid on the bulk material and guided by the formed upper surface of the bulk material support element. The bulk material can in particular have a sufficiently large (average) grain size, which in particular prevents scouring of the submarine cable and/or erosion of the bulk material support element as a result of the prevailing sea current.

The average grain size can be between 1 mm and 5000 mm. Preferably, the average grain size can be between at least 200 mm and 5000 mm, further preferably between at least 1000 mm and 5000 mm.

According to a preferred embodiment of the offshore wind energy system according to the application, the at least one support element may be a precast concrete component. In particular, the precast concrete component may be prefabricated, in particular from a mineral building material described above. The at least one precast concrete element may then be arranged, in particular lowered, adjacent to the foundation (aligned with the cable bushing). A simple installation of the offshore wind energy system is possible.

Preferably, a wedge-shaped respectively ramp-shaped support element described above may be a single (one-piece) precast concrete component. Also, such a support element may be formed from a plurality of precast concrete elements.

In other variants of the application, the at least one support element may also be a prefabricated metal component, such as a prefabricated steel component.

According to a further embodiment of the offshore wind energy system according to the application, the at least one support element may be a rope tensioning arrangement anchorable to the underwater bottom. In particular, a plurality of anchorable rope tensioning arrangements may be arranged in series in a radial direction as a cable guide arrangement.

A rope and chain, respectively, of a rope tensioning arrangement may be positioned over the submarine cable to be guided. The ends of the rope and chain, respectively, may be anchored in the underwater bottom (for example by suitable anchors) in particular in such a way that the rope and chain, respectively, is braced above the submarine cable. Due to the bracing, a force acting at least in the vertical direction (in particular in the direction of the underwater bottom surface) can be exerted on the submarine cable. This allows the submarine cable to be supported at least in the vertical direction. Cable fixing modules (for example sleeves) can be arranged on the submarine cable to fix the rope and chain, respectively, to the submarine cable.

As has already been described, a plurality of rope tensioning arrangements may be arranged, wherein the length of the rope and chain, respectively, starting from the outer shell surface of the first wall may reduce in the radial direction (in an anchored and in particular tensioned state). In particular, the length is the length between the two anchors (assuming that all anchors are buried to the same depth).

According to a preferred embodiment of the offshore wind energy system according to the application, the at least one support element may comprise a cable receptacle for guiding the submarine cable. The shape of the cable receptacle may in particular correspond to the (outer) shape of the submarine cable. By providing such a cable receptacle, the submarine cable can be safely guided and supported in particular in vertical direction, preferably also in horizontal direction.

Particularly preferably, the cable receptacle may be a channel-like and in a radial direction extending recess in an upper surface of the at least one support element. If the cable guide arrangement is formed by a plurality of support elements, preferably each support element may have such a recess. The support elements may be positioned such that the respective recesses are aligned with each other.

In particular, an (inner) diameter of the recess may be at least larger than an outer diameter of the submarine cable.

Preferably, the channel-like recess can form a ¾ circle (cross-sectional view) with a cable opening, either as an upwardly open continuous slot or with an opening arranged at the end remote from the hollow structural element and having a width greater than the cable diameter, preferably cable diameter plus 5 mm, more preferably cable diameter plus 20 mm.

For an even further reduction of the load on the submarine cable—even in strong currents—according to a preferred embodiment of the offshore wind energy system according to the application, the cable guide arrangement may comprise at least one cable fixing module. The at least one cable fixing module may be configured to fix the submarine cable to the cable guide arrangement. In particular, the at least one cable fixing module may cooperate with the at least one support element such that the submarine cable is fixed to the support element, in particular is further restricted in its freedom of movement.

Preferably, the at least one cable fixing module may be a clip mechanism (in particular at least one clip). In particular, a clip mechanism allows the submarine cable to be clamped to the at least one support element. A clip mechanism is in particular easy to install in a simple manner.

Alternatively or additionally, the at least one cable fixing module can be a backfill material, in particular a cable cement (e.g. CableCem®). By using a mineral backfill material, the submarine cable can be securely fixed. A further advantage of a backfill material, in particular a cable cement, is its good thermal conductivity. The low thermal resistance of a cable cement in particular ensures excellent heat dissipation and thus lower energy loss in the cable harness.

Preferably, a backfill material (e.g., made of gray cast iron) can be used in a bulk support element for securely fixing the submarine cable.

A further aspect of the application is an offshore structure, in particular an offshore wind energy structure. The offshore structure comprises at least one offshore wind energy system previously described. The offshore structure comprises at least one offshore device supported by a foundation of the offshore wind energy system.

A further aspect of the application is a cable guide arrangement for an offshore structure, in particular a previously described offshore structure. The cable guide arrangement comprises at least one support element (described above) arranged at an outer shell surface of the first wall of the first hollow structural element, wherein the support element is configured to guide a submarine cable exiting a cable bushing of a first wall of a first hollow structural element of the offshore structure from the cable bushing to an underwater bottom surface.

A still further aspect of the application is a use of a previously described cable guide arrangement for guiding a submarine cable exiting a cable bushing of a first wall of a first hollow structural element of a foundation of an offshore structure from the cable bushing to an underwater bottom surface.

The features of the offshore wind energy systems, offshore structures, uses and cable guide arrangements are freely combinable with each other. In particular, features of the description and/or dependent claims may be independently inventive, even by completely or partially bypassing features of the independent claims, in a sole position or freely combined with each other.

BRIEF DESCRIPTION OF DRAWINGS

There are now a multitude of possibilities to design and further develop the offshore wind energy system according to the application, the offshore structure according to the application, the use according to the application and the cable guide arrangement according to the application. For this purpose, reference is made, on the one hand, to the claims subordinate to the independent claims and, on the other hand, to the description of embodiments in connection with the drawing. The drawing shows:

DETAILED DESCRIPTION

In the following, the same reference signs are used for the same elements. Furthermore, in the following, z refers to the vertical axis respectively direction and r refers to the radial direction. Furthermore, in the present application, the expressions "bottom", "lower" etc. and "top", "upper" etc. refer in particular to the vertical axis z and in particular to the installation state of the foundation or offshore structure.

Figure 1:
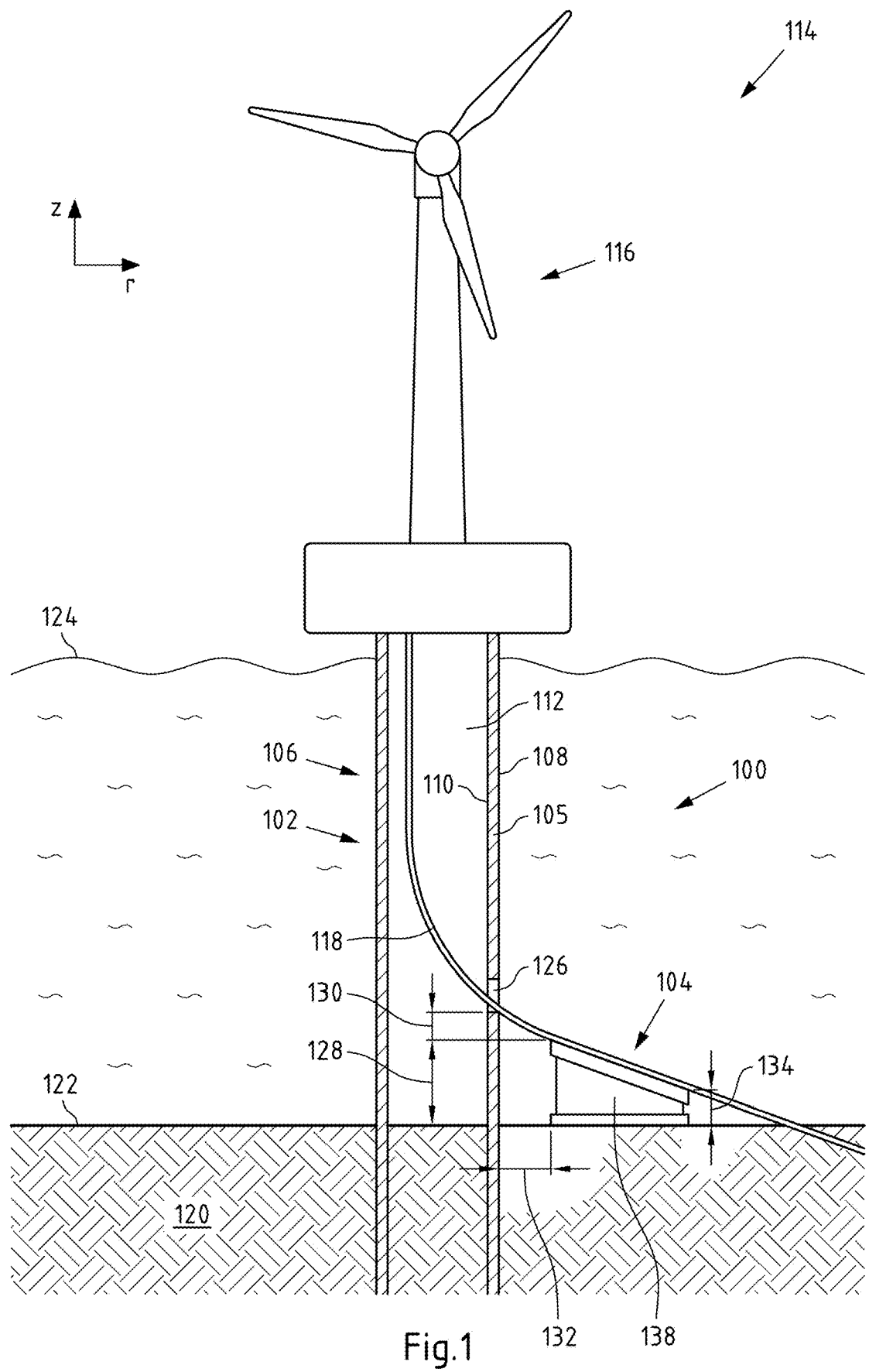
FIG. 1 is a schematic view of an embodiment of an offshore structure according to the present application with an embodiment of an offshore wind energy system according to the present application.

FIG. 1 shows a schematic view of an embodiment of an offshore structure 114 according to the present application with an embodiment of an offshore wind energy system 100 according to the present application.

As an offshore structure 114, an offshore wind energy structure 114 in the form of an offshore wind turbine 114 is exemplarily shown herein. Presently, the offshore structure 114 and thus a foundation 102 of the offshore structure 114 are shown in an installation state. The following embodiments can be readily applied to other offshore structures.

The offshore structure 114 comprises at least one offshore wind energy system 100 and at least one offshore device 116 (presently, e.g., tower, rotor, generator, etc.). In particular, a submarine cable 118 is connected to the offshore device 116 to transport, in particular, the generated electrical energy and electrical current, respectively, to a further entity.

In the present context, a submarine cable 118 is in particular a power cable, in particular a medium voltage cable 118 with a power capacity between 3 MW and 70 MW, preferably between 9 MW and 60 MW, or a high voltage cable 118 with a power capacity between 70 MW and 2.5 GW, preferably between 360 MW and 1500 MW.

The offshore wind energy system 100 comprises a foundation 102 and a cable guide arrangement 104 arranged adjacent to the foundation 102.

In the present embodiment, the foundation 102 comprises a first hollow structural element 106 respectively a first tower-shaped foundation structure 106. The first hollow structural element 106 comprises a circumferential first wall 105 extending in a longitudinal direction (i.e., along a longitudinal axis of the hollow structural element 106).

At the lower end of the first hollow structural element 106, the first wall 105 is bounded by a lower end face. At the upper end of the first hollow structural element 106, the first wall is bounded by an upper end face.

Preferably, the first hollow structural element 106 has a circular cross-sectional area. In other variations of the application, another cross-sectional shape may be provided, such as an elliptical or oval shape. In particular, the first hollow structural element 106 may be formed as a hollow pile 106 having an interior 112. The submarine cable 118 may be guided downwardly through the interior 112, and in particular may be freely suspended within the interior 112.

The first wall 105 comprises an inner shell surface 110 and an inner wall 110, respectively, and an outer shell surface 108 and outer wall 108, respectively. The inner shell surface 110 faces toward the interior 112, while the outer shell surface 108 faces outward.

In other words, a wall is in particular bounded by an inner wall and an outer wall respectively by an inner diameter and an outer diameter. The wall is in particular the outer boundary of a hollow structural element.

As described above, FIG. 1 shows the foundation 102 in an installation state in which a tie-in end of the at least one hollow structural element 106 is founded in the underwater bottom 120 (reference 122 denotes the subsea floor surface), i.e., is tied into the underwater bottom 120 at a certain depth or tie-in length (e.g., between 7 m and 20 m).

In the present case, the first hollow structural element 106 protrudes above the water surface 124.

The first wall 105 is preferably made of concrete (as has been described previously), in particular cast from concrete.

As can be seen from FIG. 1, the wall strength and wall thickness, respectively, in the longitudinal direction (z) remains constant respectively unchanged along the entire length of the first hollow structural element 106. In other variants of the application, the wall thickness of a hollow structural element may also change. For example, the wall thickness may taper from the upper end face to the lower end face, such as by the inner diameter increasing and the outer diameter remaining constant or the outer diameter decreasing and the inner diameter remaining constant.

In order to guide the submarine cable from the interior 112 to the outside (respectively in the opposite direction), a cable bushing 126 penetrating through the first wall 105 is arranged in the first wall 105. The submarine cable 118 can exit to the outside through the cable bushing 126.

According to the application, the offshore wind energy system 100 comprises at least one cable guide arrangement 104 extending in a radial direction r (and horizontal direction in the installation state) and arranged on the outer shell surface 108 of the first wall 105 of the first hollow structural element 106, wherein the cable guide arrangement 104 is configured to guide the submarine cable 118 exiting the cable bushing 126 from the cable bushing 126 to an underwater bottom surface 122 of the underwater bottom 120.

The cable guide arrangement 104 comprises a support element 138. The support element 138, which is formed in the form of a ramp, is configured in particular for vertical supporting the submarine cable 118, i.e., for limiting the freedom of movement of the submarine cable 118 at least in the vertical direction z.

In particular, the exited and guided out submarine cable 118 is guided through the upper (sloped) surface of the support element 138 from the cable bushing 126 to an underwater bottom surface 122 of the underwater bottom 120 and supported downwardly.

Preferably, the at least one support element 138 may be radially spaced from the outer shell surface 108. In other words, a support element preferably does not (in principle) contact either the first or the second hollow structural element.

The radial distance 132 between the outer shell surface 108 and the side of the support element 138 facing the outer shell surface may be, for example, between 0.2 m and 4 m, preferably between 0.5 m and 2 m.

As can be further seen, the upper end of the support element 138 is preferably vertically spaced from the lower edge of the cable bushing 126. The vertical distance 130 between the lower edge of the cable bushing 126 and the upper end (respectively the highest vertical point) of the support element 138 may be between 0.5 m and 2 m.

The dimensioning of the distances 130, 132 depends in particular on the permissible bending radius of the submarine cable 118. In addition, the maximum height 134 of the support element 138 and/or the slope of the ramp of the support element 138 may also depend on the bending radius of the submarine cable 118. Presently, the end of the support element 138 facing away from the outer wall 108 has a vertical height 128 that may range from 0 m to 7.5 m.

Preferably, the cable bushing 126 of the first hollow structural element 106 is at least more than 5 m above the underwater bottom surface 122 in the depicted installation state of the foundation 102, in particular more than 6 m, in particular preferably between 8 m and 12 m. In other words, the vertical distance between the underwater bottom surface 122 and the cable bushing 126, in particular the lower edge of the cable bushing 126, may be more than 5 m, preferably more than 6 m, more preferably between 8 m and 12 m.

Furthermore, in the present embodiment, the height of the at least one support element 238 decreases steadily in the radial direction from the end of the support element 238 facing the outer shell surface 108 to the end of the support element 238 facing away from the outer shell surface 108.

Figure 2:
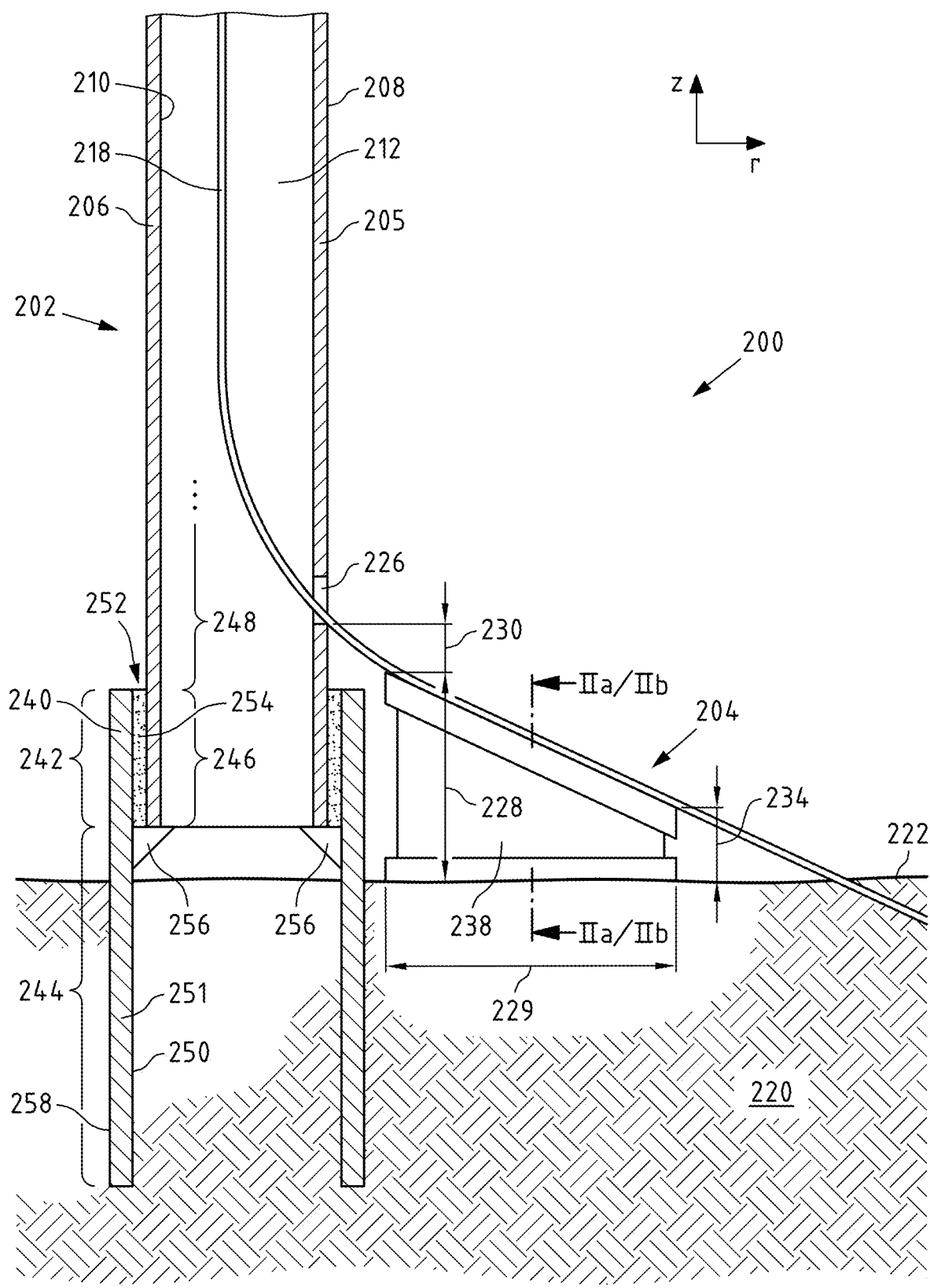
FIG. 2 is a schematic view of a further embodiment of an offshore wind energy system according to the present application.
Figure 2A:
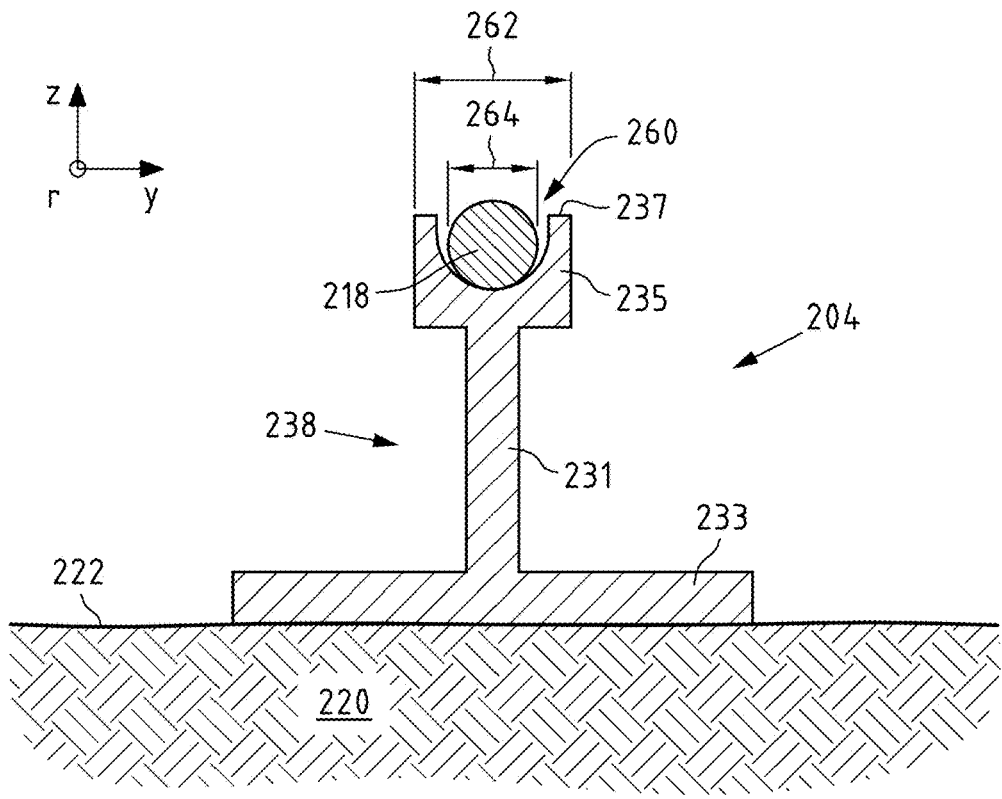
FIG. 2a is a schematic view of an embodiment of a cable guide arrangement used in the embodiment according to FIG. 2 according to the present application.
Figure 2B:
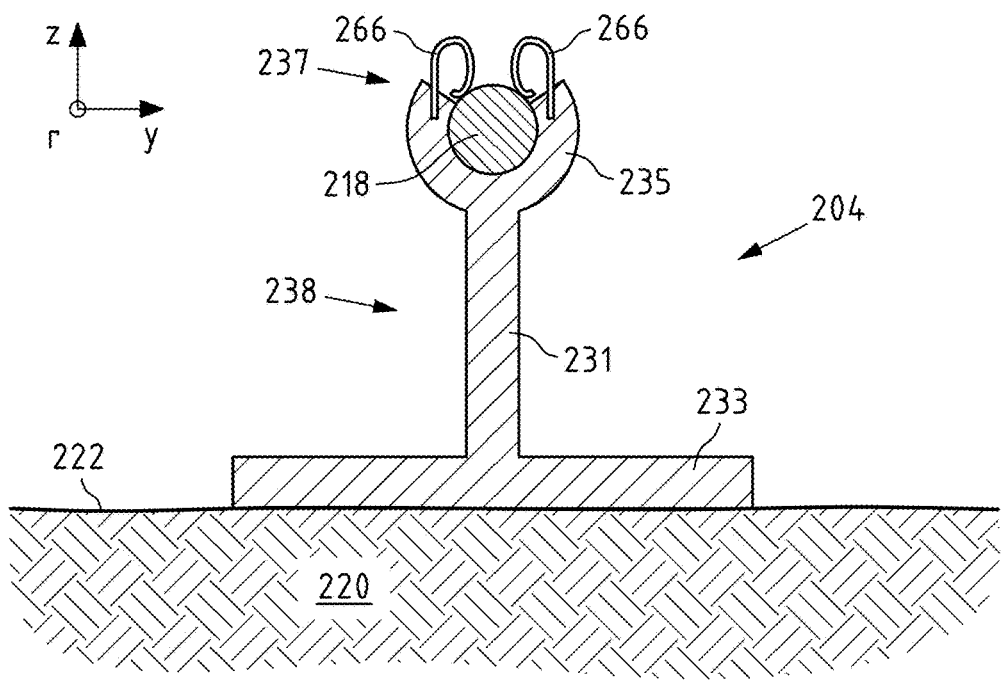
FIG. 2b is a schematic view of a further embodiment of a cable guide arrangement used in the embodiment according to FIG. 2 in accordance with the present application.

FIGS. 2 to 2b show schematic views of a further embodiment of an offshore wind energy system 200 according to the present application for an offshore structure. In order to avoid repetitions, essentially only the differences to the previous embodiments are described below, and otherwise reference is made to explanations of FIG. 1.

The foundation 202 comprises a first hollow structural element 206 and a second hollow structural element 240.

The first (in particular cylindrical) hollow structural element 206 may also be referred to as the transition piece 206, and the second (in particular cylindrical) hollow structural element 240 may be referred to as the embedded element 240.

The second hollow structural element 240 comprises an overlap portion 242 and an embedded portion 244. The embedded portion 244 is at least partially embedded in the underwater bottom 220.

The overlap portion 242 of the second hollow structural element 240 overlaps with an end portion 246 and a further overlap portion 246, respectively, of the first hollow structural element 206 (in an overlap region of the foundation). In particular, as can be seen, the first hollow structural element 206 is inserted in the second hollow structural element 240. In particular, the lower end face of the first hollow structural element 206 rests on at least one (circumferential) and radially inwardly projecting stop 256. The at least one stop 256 may be attached, for example welded, to an inner surface 250 of a second (circumferential and extending in a longitudinal direction z) wall 251.

In the present case, an annular space 252 is formed in the overlap region between the inner shell surface 250 of the second hollow structural element 240 and the outer shell surface 208 of the first hollow structural element 206. As already explained at the beginning, the annular space 252 is filled, in particular grouted, with filling material 254, in particular a grout, in the case of the shown grout connection. The filling material 254 is introduced into the annular space 252 after the first hollow structural element 206 has been inserted into the hollow structural element 240.

The transition portion 248 is adjacent to the end portion 246 and overlap portion 246, respectively. In particular, the transition piece 206 protrudes from the second hollow structural element 240 with the transition portion 248.

In variants of the application, an (expandable) seal may alternatively or additionally be arranged in the annular space. Furthermore, in variants of the application, at least one insertion aid, alignment aid or the like can be provided for aligning the hollow structural elements with respect to one another.

Further, the offshore wind energy system 200 presently comprises a cable guide arrangement 204 comprising a (single) ramp-shaped support element 238. The support element 238 may preferably be a precast concrete element 238. A sectional view of a first embodiment of the cable guide arrangement 204 is shown in FIG. 2a, and a further embodiment of the cable guide arrangement 204 is shown in FIG. 2b.

The support element 238, which is in particular formed integrally, may comprise a foot portion 233, a head portion 235 having an upper surface 237, and a connecting portion 231 connecting the foot portion 233 and the head portion 235. In particular, the support element 238 may be supported on the underwater bottom surface 222 by means of the foot portion 233.

Preferably, a cable receptacle 260 for guiding the submarine cable 218 may be provided in the support element 238, in particular in the head portion 235. As can be seen, the shape of the cable receptacle 260 corresponds in particular to the shape of the submarine cable 218.

The illustrated support element 238 supports the submarine cable 218 at least in a vertical direction. In particular, at least the freedom of movement downward (toward the underwater bottom surface 222) is limited by the at least one support element 238.

In the present embodiment, the cable receptacle 260 is a channel-like recess 260 extending in a radial direction r (preferably along the entire length 229 of the support element 238) and formed in the upper surface 237 of the support element 238. The diameter 262 of the recess 260 may be at least larger than an outer diameter 264 of the submarine cable 218.

In contrast to FIG. 2a, the diameter 262 of the recess 260 is smaller and is nearly equal to the outer diameter 264 of the submarine cable 218. In addition, in a cross-sectional view, the recess 260 is in the shape of a ¾ circle in the embodiment shown in FIG. 2b, whereas in FIG. 2a it is in a semicircular shape.

For a secure fixation of the submarine cable 218, optionally at least one cable fixing module 266 may be provided (cf. FIG. 2b) which is configured to fix the submarine cable 218 to the cable guide arrangement 204, in particular to the at least one support element 238. In particular, in FIG. 2b a clip mechanism 266 is provided, in the present case in the form of two clips 266.

For example, in the embodiment according to FIG. 2a, after (or even before) arranging the submarine cable 218 in the receptacle 260, it would be conceivable to grout the submarine cable and the receptacle with a backfill material (not shown), in particular a cable cement.

Figure 3:
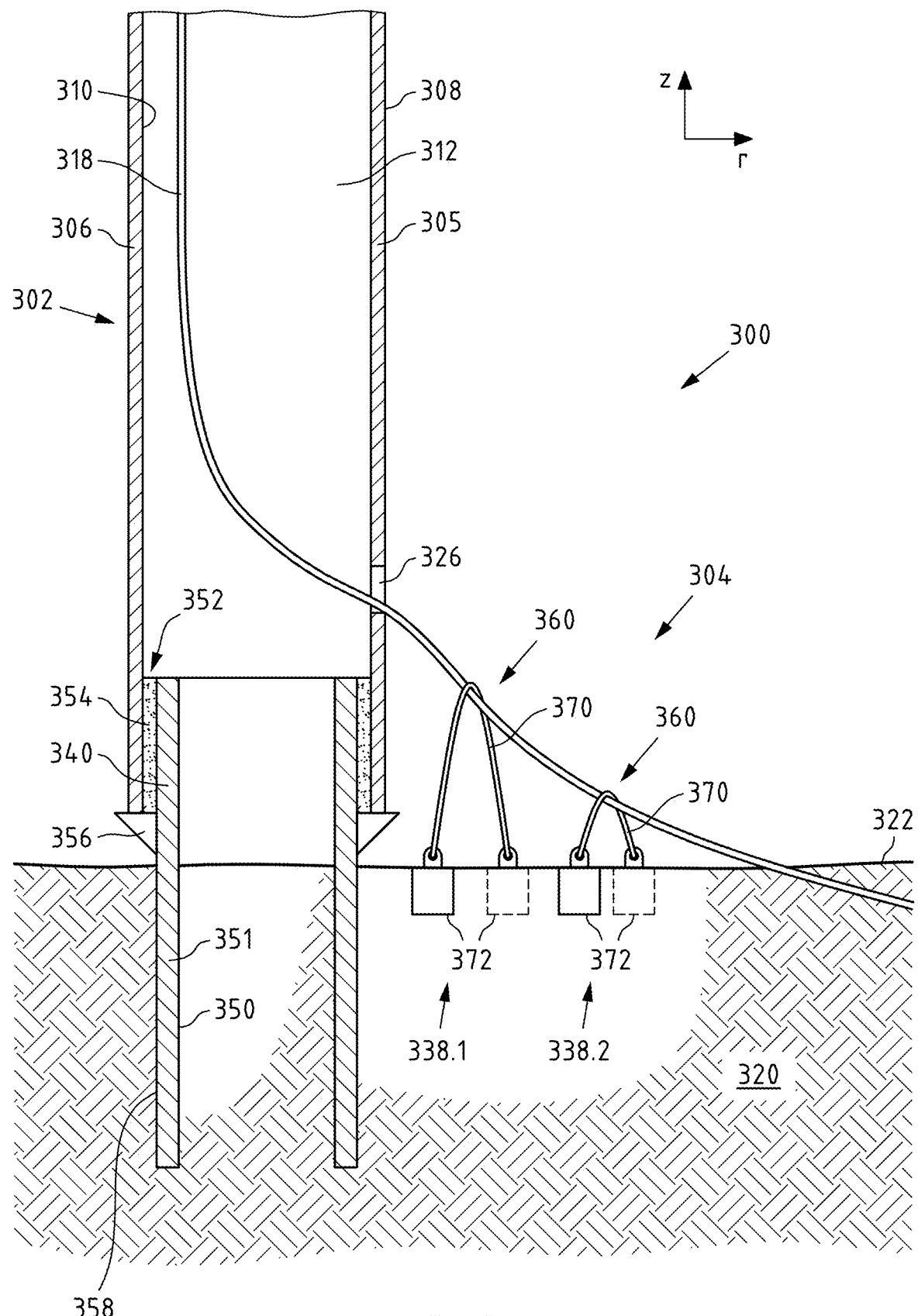
FIG. 3 is a schematic view of a further embodiment of an offshore wind energy system according to the present application.

FIG. 3 shows a schematic view of a further embodiment of an offshore wind energy system 300 according to the present application for an offshore structure. In order to avoid repetitions, essentially only the differences to the preceding embodiments are described below, and otherwise reference is made to the discussion of FIGS. 1 through 2b.

First, in the present embodiment, an annular space 352 is formed between the outer shell surface 358 of the second hollow structural element 340 and the inner shell surface 310 of the first hollow structural element 306. The annular space 352 is filled with grout 354 (mortar), by way of example. As can be seen, at least one radially outwardly facing stop 356 is formed on the outer shell surface 358 of the second wall 351 in an embedded portion of the second hollow structural element 340.

The cable guide arrangement 304 comprises a plurality of support elements 338.1, 338.2 (for the sake of clarity, only two support elements 338.1, 338.2 are exemplarily shown herein). As can be seen, the support elements 338.1, 338.2 have a different height and distance, respectively, to the underwater bottom surface 322. In other words, in the present embodiment, the height of the support elements 338.1, 338.2 reduces in a step-like manner in the radial direction from the first support element 338.1 to the last support element 338.2. In particular, different rope lengths are provided.

In the present embodiment, the at least one support element 338.1, 338.2 is a rope tensioning arrangement 338.1, 338.2 that is anchorable to the underwater bottom 320. A rope tensioning arrangement 338.1, 338.2 comprises a rope 370 (and chain, respectively), each end of which is connected to an anchor 372 that is at least partially buried in the underwater bottom 320.

A rope 370 of a rope tensioning arrangement 338.1, 338.2 is tensioned over the submarine cable 318 such that the submarine cable 318 is supported in at least one vertical direction. In particular, a force (indicated by the arrow) is applied to the submarine cable 318 by the tensioned rope 370. The submarine cable 318 can thereby be safely guided from the cable bushing 326 to the underwater bottom surface 322.

At least one (not shown) cable fixing module, such as a clip or staple mechanism, may optionally be provided to fix the submarine cable 318 to a support element 338.1, 338.2.

Additionally, a submarine cable 318 may have (evenly) spaced fixedly mounted (not shown) cable fixing modules to which a rope may be fixed. For example, sleeves may be provided on the submarine cable.

Figure 4:
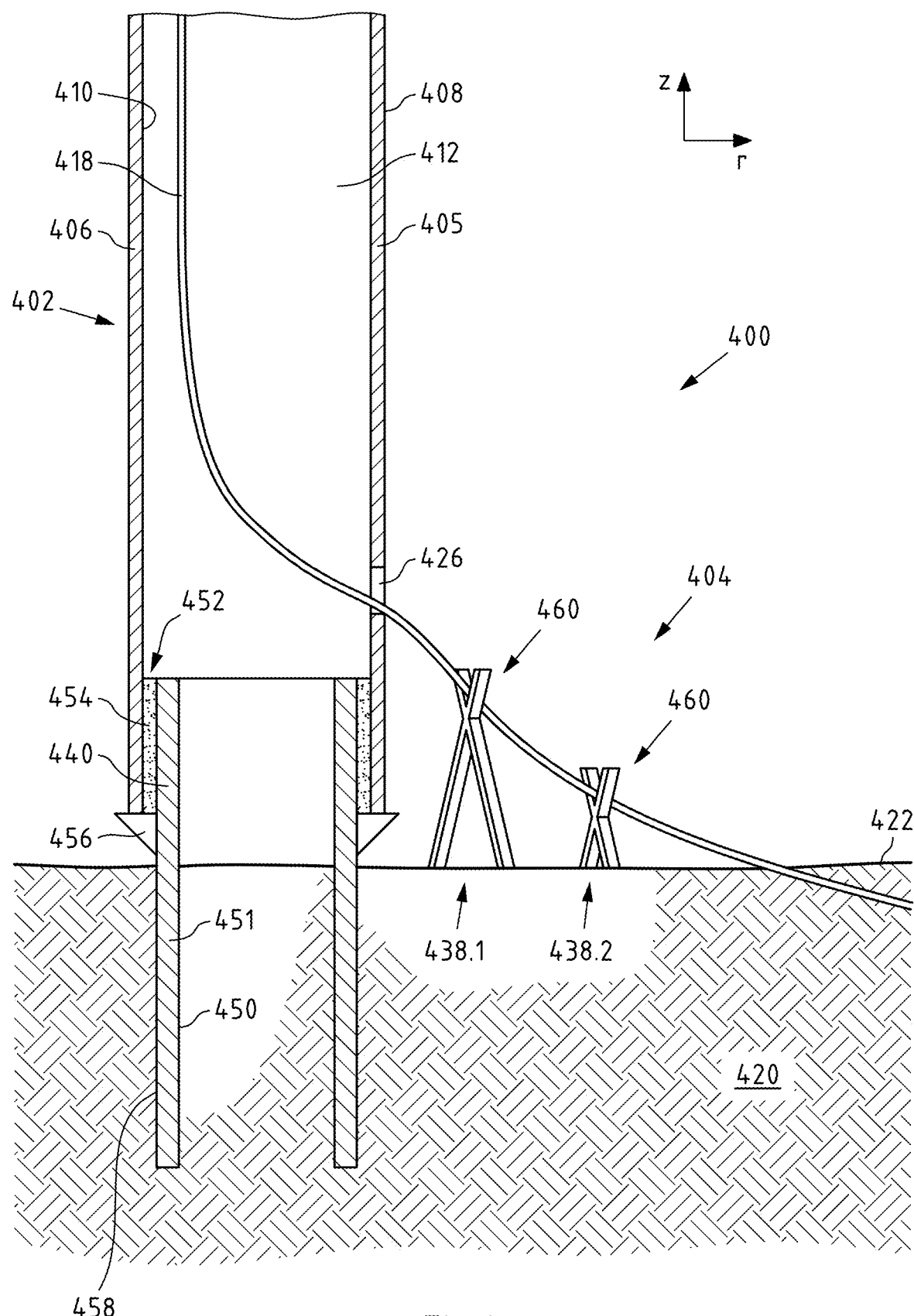
FIG. 4 is a schematic view of a further embodiment of an offshore wind energy system according to the present application.

FIG. 4 shows a schematic view of a further embodiment of an offshore wind energy system 400 according to the present application for an offshore structure. In order to avoid repetitions, essentially only the differences to the preceding embodiments are described below, and otherwise reference is made to the explanations of FIGS. 1 to 3.

In contrast to FIG. 3, a plurality of support elements 438.1, 438.2 (for the sake of clarity, only two support elements 438.1, 438.2 are shown as examples) are arranged with a channel-like recess 460 as a cable receptacle 460. A support element 438.1, 438.2 may be firmly anchored in the underwater bottom 420.

As can be seen, the support elements 438.1, 438.2 have a different height respectively distance to the underwater bottom surface 422. In other words, in the present embodiment, the height of the support elements 438.1, 438.2 reduces in a step-like manner in the radial direction from the first support element 438.1 to the last support element 438.2.

Figure 5:
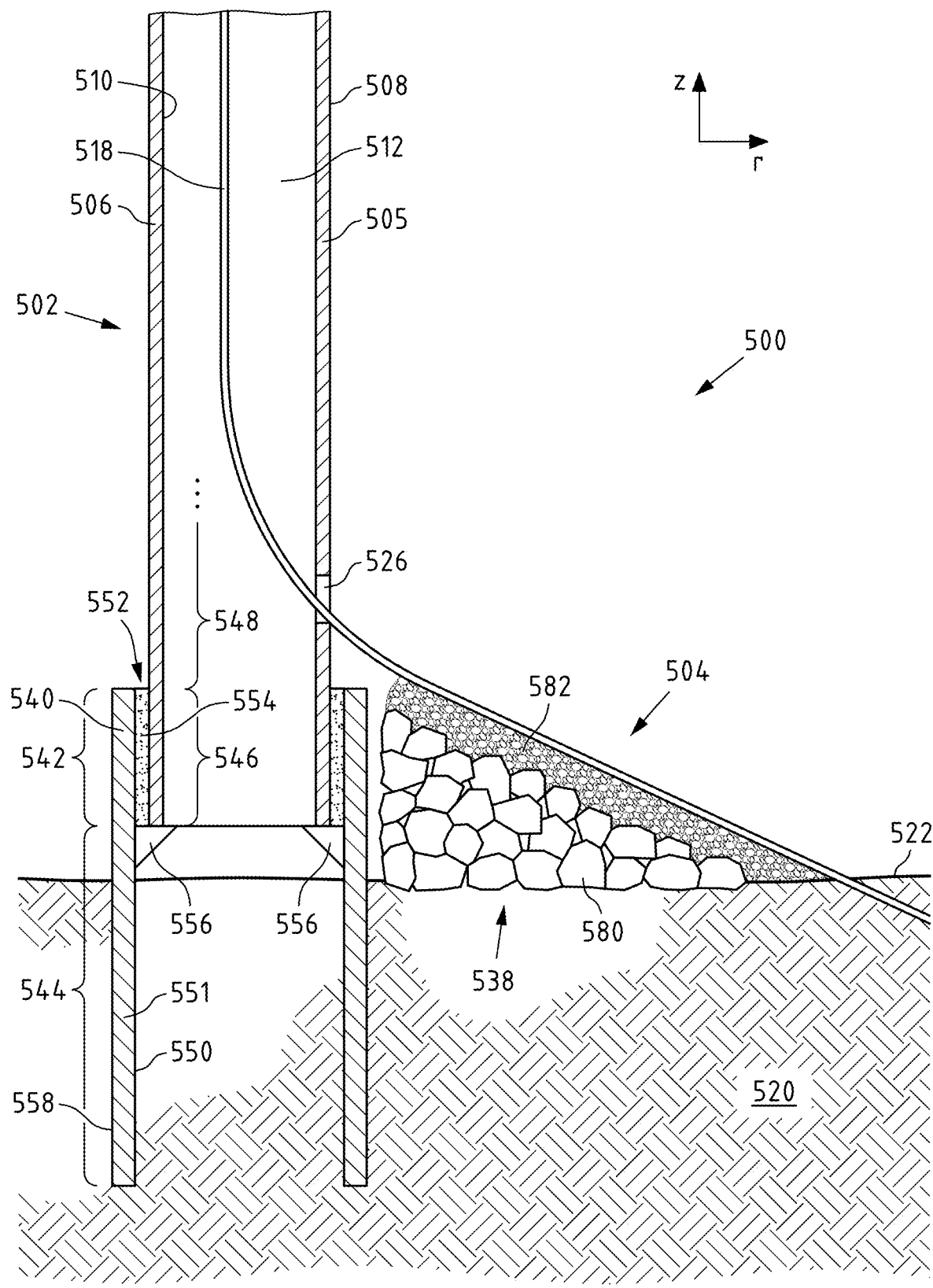
FIG. 5 is a schematic view of a further embodiment of an offshore wind energy system according to the present application.

FIG. 5 shows a schematic view of a further embodiment of an offshore wind energy system 400 according to the present application for an offshore structure. In order to avoid repetitions, essentially only the differences from the preceding embodiments are described below, and otherwise reference is made to the explanations of FIGS. 1 to 4. The first part (in particular cylindrical) hollow structural element 406 may also be referred to as the transition piece 406, as in FIG. 2.

Presently, the at least one support element 538 is formed by bulk material 580. The bulk material 580 (e.g., in the form of lumps of rock 580) may be ramped up against an outer wall 508, preferably at a distance.

The submarine cable 518 may then be laid on the bulk material 580 and guided through the formed upper surface (in particular, a sufficiently wide and sloping plateau) of the bulk material support element 538. In particular, the bulk material 580 may have a sufficiently large (average) grain size that prevents, in particular, scouring of the submarine cable and/or erosion of the bulk material support element 538 as a result of the prevailing ocean current.

The average grain size can be between 1 mm and 5000 mm. Preferably, average grain size can be between at least 200 mm and 5000 mm, further preferably between at least 1000 mm and 5000 mm.

Preferably, a backfill material 582 (e.g., grout, gray cast iron, cable cement, etc.) may be cast on the upper surface of the bulk support element 538, in particular at least partially over the submarine cable 518. In this way, the submarine cable 518 can be fixed even more securely.

Reference sign 546 denoted the end portion respectively overlap portion. The first (in particular cylindrical) hollow structural element 506 may also be referred to as the transition piece 506, as in FIG. 2.

It shall be understood that the embodiments may be combined with each other. For example, different support elements can be combined with each other and/or different cable guide arrangements can be combined with different foundations, for example, the cable guide arrangement 300 can be used with the foundation according to FIG. 1 or FIG. 2.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An offshore wind energy system, comprising:
    a foundation having a first hollow structural element with a longitudinally extending, circumferential first wall,
    wherein a cable bushing is arranged entirely within the first wall, and
    at least one cable guide arrangement extending in radial direction, wherein the at least one cable guide arrangement is configured to guide a submarine cable exiting the cable bushing from the cable bushing to a submarine bottom surface,
    wherein the at least one cable guide arrangement and at least one element of the at least one cable guide arrangement do not directly contact an outer shell surface of the first hollow structural element and are arranged at a radial distance between 0.25 m and 3 m from the outer shell surface.

2. The offshore wind energy system according to claim 1, wherein
    the cable bushing of the first hollow structural element in an installation state of the foundation is at least above 5 m above an underwater bottom surface.

3. The offshore wind energy system according to claim 2, wherein the cable bushing of the first hollow structural element in an installation state of the foundation is at least above 6 m above the underwater bottom surface.

4. The offshore wind energy system according to claim 3, wherein the cable bushing of the first hollow structural element in an installation state of the foundation is between 8 m and 12 m above the underwater bottom surface.

5. The offshore wind energy system according to claim 1, wherein the foundation comprises:
    a second hollow structural element having an overlap portion projecting beyond an end portion of the first hollow structural element and having an embedded portion at least partially embeddable in the underwater bottom,
    the cable bushing of the first hollow structural element is arranged at least above the overlap portion.

6. The offshore wind energy system according to claim 5, wherein
    an annular space between an inner shell surface of the second hollow structural element and the outer shell surface of the first hollow structural element is at least partially grouted,
    and/or
    an annular space between an outer shell surface of the second hollow structural element and an inner shell surface of the first hollow structural element is at least partially grouted.

7. The offshore wind energy system according to claim 1, wherein
    the at least one cable guide arrangement comprises at least one support element configured to at least vertically support the submarine cable.

8. The offshore wind energy system according to claim 7, wherein
    a height of the at least one support element is reduced stepwise or continuously in the radial direction.

9. The offshore wind energy system according to claim 7, wherein
    the at least one support element is a precast concrete element.

10. The offshore wind energy system according to claim 9, wherein
    an at least one support element comprises a cable receptacle for guiding the submarine cable,
    a shape of the cable receptacle corresponds to a shape of the submarine cable.

11. The offshore wind energy system according to claim 10, wherein
    the cable receptacle is a channel-like recess extending in a radial direction in an upper surface of the at least one support element,
    wherein a diameter of the recess is at least larger than an outer diameter of the submarine cable.

12. The offshore wind energy system according to claim 7, wherein
    the at least one support element is a cable tensioning arrangement anchorable to the underwater bottom.

13. The offshore wind energy system according to claim 1, wherein
    the at least one cable guide arrangement comprises at least one cable fixing module configured to fix the submarine cable to the at least one cable guide arrangement.

14. The offshore wind energy system according to claim 13, wherein
    the at least one cable fixing module is a clip mechanism.

15. The offshore wind energy system according to claim 13, wherein
    the at least one cable fixing module is a backfill material.

16. The offshore wind energy system according to claim 15, wherein
the backfill material is a cable cement.
17. An offshore structure, comprising:
at least one offshore wind energy system according to claim 1; and
at least one offshore device supported by a foundation of the at least one offshore wind energy system.
18. The offshore structure according to claim 17, wherein the offshore structure is an offshore wind energy structure.

* * * * *